US012710574B2

(12) United States Patent
Eblagon et al.

(10) Patent No.: US 12,710,574 B2
(45) Date of Patent: Aug. 18, 2026

(54) POLARIZING LIGHT FILTER

(71) Applicant: Lankhorst Touwfabrieken B.V., Sneek (NL)

(72) Inventors: Fernando Andres Eblagon, Maia (PT); Rui Francisco De Neiva Moura Bastos, Baguim do Monte (PT)

(73) Assignee: Lankhorst Touwfabrieken B.V., Sneek (NL)

( * ) Notice: Subject to any disclaimer, the term of this patent is extended or adjusted under 35 U.S.C. 154(b) by 279 days.

(21) Appl. No.: 18/556,792

(22) PCT Filed: Sep. 9, 2022

(86) PCT No.: PCT/NL2022/050510
§ 371 (c)(1),
(2) Date: Oct. 23, 2023

(87) PCT Pub. No.: WO2023/038523
PCT Pub. Date: Mar. 16, 2023

(65) Prior Publication Data

US 2024/0176056 A1 May 30, 2024

(30) Foreign Application Priority Data

Sep. 9, 2021 (NL) ..................................... 2029163

(51) Int. Cl.
*G02B 5/30* (2006.01)
*G02B 1/04* (2006.01)

(52) U.S. Cl.
CPC ............. *G02B 5/3025* (2013.01); *G02B 1/04* (2013.01)

(58) Field of Classification Search
CPC .......... G02B 5/3025; G02B 1/04; G02B 1/08; G02B 5/305
See application file for complete search history.

(56) References Cited

U.S. PATENT DOCUMENTS 1,918,848 A 7/1933 Land et al.
2,237,567 A 4/1941 Land
(Continued)

FOREIGN PATENT DOCUMENTS

JP 2005173454 A 6/2005
WO 2018164176 A1 9/2018
(Continued)

OTHER PUBLICATIONS

Schimanski, et al., "On the overdrawing of melt-spun isotactic polypropylene tapes." Journal of Applied Polymer Science vol. 103, 2920-2931, (2007).
(Continued)

*Primary Examiner* — Dmitriy Bolotin
(74) *Attorney, Agent, or Firm* — Dentons US LLP

(57) ABSTRACT

The invention is directed to a polarizer comprising an elongated element comprising a polyolefin, wherein the elongated element is unidirectionally drawn at a draw ratio within an overdrawing region and wherein the elongated element has a polarizing effect of at least 5%. The invention further relates to a method for producing said polarizer by drawing an undrawn or partially drawn elongated element within an overdrawing region and to particular uses and applications of said polarizer.

19 Claims, 10 Drawing Sheets

(56) References Cited

U.S. PATENT DOCUMENTS

| | | | | |
|---|---|---|---|---|
| 3,016,071 | A | 1/1962 | Myron et al. | |
| 5,051,286 | A * | 9/1991 | Starzewski | C08F 38/00 428/910 |
| 5,666,223 | A | 9/1997 | Bennett et al. | |
| 6,814,899 | B2 | 11/2004 | Cael et al. | |
| 6,834,956 | B2 | 12/2004 | Phillips | |
| 2004/0125339 | A1 | 7/2004 | Phillips | |
| 2006/0007375 | A1 * | 1/2006 | Nagashima | G02B 5/3083 349/117 |
| 2006/0164570 | A1 * | 7/2006 | Li | G02B 5/3041 349/96 |
| 2006/0274415 | A1 * | 12/2006 | Murata | G02B 5/3058 359/485.05 |
| 2009/0034073 | A1 * | 2/2009 | Lazarev | G02B 1/04 359/489.17 |
| 2014/0264979 | A1 | 9/2014 | Park et al. | |
| 2014/0268002 | A1 * | 9/2014 | Inomata | G02B 30/25 349/194 |
| 2017/0254938 | A1 * | 9/2017 | Ohno | H10K 59/8791 |

FOREIGN PATENT DOCUMENTS

| | | | |
|---|---|---|---|
| WO | 2018235461 | A1 | 12/2018 |
| WO | 2019069757 | A1 | 4/2019 |

OTHER PUBLICATIONS

Maaty, et al., "On the formation of defects in drawn polypropylene fibres." Polymer, vol. 37, 213-218, (1996).

Zhang, et al., "Influence of pentaerythritol on the properties of polyvinyl alcohol films for the polarizers." Journal of Polymer Research 27, 31, (2020).

* cited by examiner

POLARIZING LIGHT FILTER

CROSS REFERENCE TO RELATED APPLICATIONS

This application is a 371 National Stage application of International Application No. PCT/NL2022/050510, filed Sep. 9, 2022, which claims the benefit of European Patent Application NL2029163, filed Sep. 9, 2021, each of which is incorporated herein by reference in its entirety.

The invention is in the field of light polarizers. In particular, the invention relates to a polarizer comprising an elongated element that comprises a polyolefin, to a fabric comprising the polarizer and to a method to produce the polarizer. The invention further relates to the use of an elongated element as polarizer, to an object molded from the fabric and to a surface of the polarizer.

In general, electric field vectors of light waves vibrate in all planes that are perpendicular to the propagation direction of the light wave. These electric field vectors may be constrained to e.g. a single plane by a linear polarizer (also referred to as a polarizing (light) filter, or simply polarizer). Polarizers are accordingly typically filters that allow passage of light waves in an essentially single plane while blocking light waves in other planes. Several day-to-day products that comprise polarizers include sunglasses, polarizing windows, advertising displays and glare masks.

As the term implies, a linear polarizer can be used to form a linearly polarized beam of light.

The mechanism behind a polarizer may differ. For instance, linear polarizers can absorb a particular direction (dichroic absorptive polarizers) and/or the polarizer can split the light beam into two polarized light beams, wherein typically one of these light beams has the desired polarization (birefringent polarizers).

Absorptive polarizers may for instance comprise long-chain polymer molecules that are oriented in a single direction, in combination with a dichroic dye. The light vibrating in the plane parallel to the orientation of the molecules (or vector components of light parallel to this plane) may be absorbed due to electrons of the dye being allowed to move along the polymer chains, while the light vibrating in orthogonal directions to the orientation (or vector components of light parallel to the orthogonal direction) may pass.

A type of absorptive polarizer is described in U.S. Pat. No. 1,918,848, wherein a polarizer (J-sheet) is described based on dichroic crystals having their polarizing axes oriented substantially parallel and are dispersed in a suspension medium.

A H-sheet polarizer is described in U.S. Pat. No. 2,237,567, wherein the polarizer is based on a complex of a dichroic stain (e.g. iodine) on molecularly oriented solid polyvinyl alcohol.

The polarizing ability of dyes may also be applied in fabrics, as for example disclosed in U.S. Pat. No. 3,016,071. Herein a woven fabric is disclosed that uses fibers of a stretched synthetic linear polymer which are dyed to make them light polarizers.

A type of absorptive polarizer with increased moisture and heat resistance, wherein the light absorptive properties originate from the matrix is described in for instance U.S. Pat. No. 5,666,223. Herein, a light polarizer (K-sheet) is described comprising a molecularly oriented sheet of polyvinyl alcohol/polyvinylene block copolymer wherein the polyvinylene blocks are formed by molecular dehydration of a sheet of polyvinyl alcohol.

U.S. Pat. No. 6,814,899 discloses a method for making a K-sheet polarizer from a polymeric sheet having a predetermined original length and comprising a hydroxylated linear high polymer, wherein the method includes stretching and dehydrating the polymeric sheet.

Prior efforts have been made to develop a polarizing standalone article, see e.g. US20040125339A1, able to withstand processing (thermoforming) temperatures of approximately 100° C. These polarizers relied on a combination of materials. Namely, a polarizing layer and a substrate of a blend of polymers able to maintain stiffness up to 100° C.

Further polarizers are described in U.S. Pat. No. 5,051,286. The polarizers have however limited mechanical and physical strength.

The aforementioned polarizers present reasonable optical properties, but their application is limited by the mechanical and physical properties of the matrix material, mainly polyvinyl alcohol or derivatives thereof. For instance, the polarizers have limited strength or fracture toughness which forces the polarizers to be supported onto a substrate and accordingly to form heavier materials.

Moreover, the conventional polarizers typically require impregnation with dichroic dyes or complex processing steps with harsh solvents to achieve a light polarization effect. Dehydration steps are also employed which require strong chemicals (e.g. highly concentrated hydrochloric acid). Additionally, the polymers and solvents used in the production of the polarizers may be corrosive to the metal surfaces of an extruder needed for processing the materials.

It is an object of the present inventors to provide a linear polarizer (herein referred to as polarizer) that at least partially overcomes the above-mentioned drawbacks. The present inventors surprisingly found that this can be achieved by a material that can be obtained by a processing method that imparts light polarizing properties into a range of different polymers without the requirement for special dyes, chemical transformations, or solvents. This allows for a cleaner, more environmentally friendly, and cheaper production method of polarizers. Furthermore, it greatly expands on the processing and working temperatures of existing polarizers by allowing them to be made into polarizers a range of polymers with their characteristic processing and work temperatures. Typically polymer light polarizers are produced from polyvinyl alcohol (PVOH). Since this polymer has its glass transition temperature in the range of 80-90° C., a strong deviation from linearity (i.e. the feature that material properties change linearly in response to temperature changes) is expected from this material below and above this point. This leads to an upper limit in their applicability, wherein the maximum advisable working temperature is in the range of 50-55° C. as disclosed in U.S. Pat. No. 5,666,223.

The polarizer of the invention comprises a polymeric elongated element which is unidirectionally drawn to a draw ratio within the overdrawing region. Processing the material within its overdrawing region is accompanied by a change in the optical properties of the material and can be also accompanied by a reduction in its density. The present inventors surprisingly found that the polarizing effect can be greatly enhanced by further increasing the draw ratio within this region.

The draw ratio is typically defined as the difference in speed between stretch rollers with which the element is drawn. The overdrawing region is known in the art as the range in which mechanical properties in the drawing direction are greatly enhanced, due to the higher molecular alignment achieved. Overdrawing is accompanied by morphological changes on the surface and in the bulk of the elongated element (see for instance Schimanski et al., *Journal of Applied Polymer Science* (2007) Vol. 103, 2920-2931). As an example, in the case of polypropylene, an overdrawn element possesses a regular arrangement of regions of fluctuating density, parallel to the drawing direction, which are crossed by wormlike structures. This feature can be explained by a deformation mechanism where the material is alternately drawn at two different draw ratios, with the wormlike structures being representative of areas drawn to a lower ratio than the parallel region.

When the element is drawn into the overdrawing region, this can generally be visually observed by a sudden reduction of transparency of the material. Overdrawn material is accordingly hazy. And when the material was colorless transparent before overdrawing, it becomes white when overdrawn. Overdrawing is accompanied by changes in mechanical properties, surface and morphology of the tapes (see for instance Schimanski et al., *Journal of Applied Polymer Science* (2007) Vol. 103, 2920-2931 and Wang et al., *Polymer* (1996), Vol. 37, 213-218).

Without wishing to be bound by theory, the sudden reduction of transparency of the material is believed to arise both from the increased crystallinity, due to the transformation from a microfibrillar to chain-extended and highly aligned structure, and from the formation of micro voids, or lower density areas in the material, leading to light scattering.

The elongated element according to the present invention preferably has a light transmittance over the visible range of 380 to 700 nm of less than 80%, preferably less than 75% as determined by UV-VIS-NIR spectrophotometry. Unless expressly indicated otherwise, light transmittance is herein expressed as the fraction of the emitted light that is passing through the elongated element.

Additionally to the change in visual appearance, the overdrawing region is known in the art as the range of draw ratios in which mechanical properties (tensile strength and stiffness) in the drawing direction are greatly enhanced, due to the higher molecular alignment achieved.

The draw ratio is typically defined as the difference in speed between stretch rollers in which the element is drawn. The fraction of overdraw ratio or Overdraw parameter is herein determined according to Equation (I)

$$\text{Overdraw parameter} = \frac{\text{draw ratio}}{\text{overdraw ratio}} \quad \text{(Equation I)}$$

wherein the overdraw ratio depends on the material and the draw ratio is the ratio at which the elongated element is drawn.

Working within the overdrawing region of a given polymer can be done by using polymers which contain a molecular entanglement density that allows the polymer to reach a high maximum draw ratio. Average molecular weights are preferably low to reduce molecular entanglement and allow such high draw ratios. On the other hand, it should be high enough to allow the necessary tensile strength. Polydispersity can also influence mechanical properties and should be kept low. Particular good results can be obtained with polypropylene having weight average molecular mass of 100 to 500 kg $mol^{-1}$, preferably 200 to 350 kg $mol^{-1}$ such as 280 kg $mol^{-1}$ and polydispersity of 3 to 7, preferably 5 to 6 such as about 5.8. With polyethylene, particular good results can be obtained with polymers having weight average molecular mass of 100 to 500 kg $mol^{-1}$, preferably 150 to 300 kg $mol^{-1}$ such as 220 kg $mol^{-1}$ and polydispersity of 3 to 7, preferably 4 to 5 such as about 4.4.

FIG. 1 schematically illustrates the light transmittance of a preferred fabric according to the present invention illuminated with linearly polarized light in two orthogonal directions.

FIG. 2 schematically illustrates the light transmittance of a preferred fabric according to the present invention illuminated with linearly polarized light in two orthogonal directions.

Figure 6:
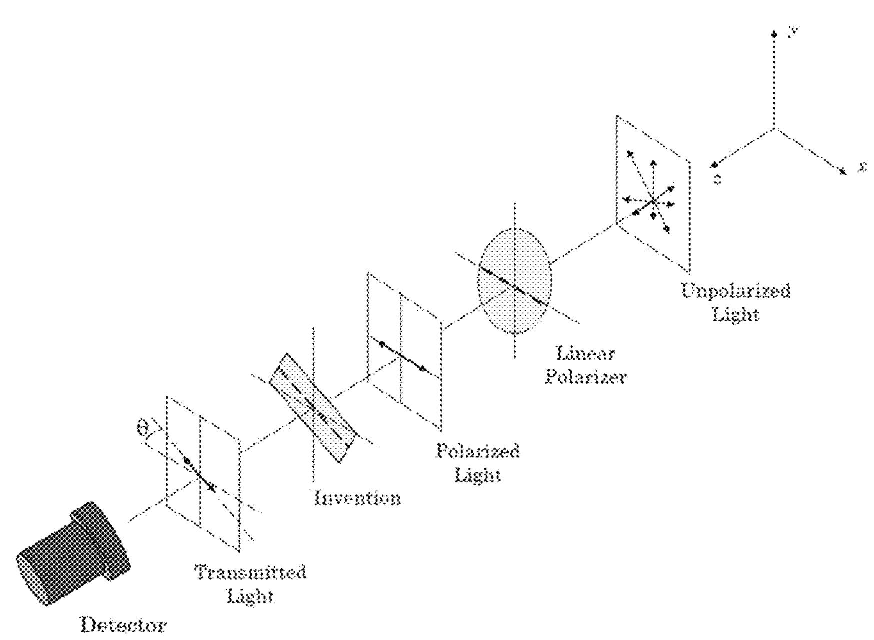
FIG. 6 illustrates the measurement apparatus to determine the polarizing effect of the invention.

Thus, in a first aspect the present invention is directed to a polarizer comprising an elongated element. The elongated element preferably comprises a multi-layered structure comprising an inner layer and one or more outer layers (herein also referred to as "outer layer(s)", "outer layer" and "outer layers"). The polarizer and preferably both optionally present inner and outer layers each independently comprise a polyolefin. The elongated element is unidirectionally drawn at a draw ratio within the overdrawing region of the selected polymer. The elongated element is capable of polarizing light and its effectiveness in this can be expressed as 'polarizing effect' (PE), which can be regarded as the difference in light transmittance of two light beams having a different polarization. Herein, the polarizing effect is defined, in accordance with equation II, as the largest difference between light transmittance of two essentially orthogonally polarized components, referred to as the maximum transmission (Tmax) and minimum transmission (Tmin) of a visible light beam, wherein Tmax and Tmin are calculated as the average light intensities over wavelengths 400 to 650 nm. These orthogonal transmission values are also referred to in the art as the transmission axis and extinction axis. Measurements of the Tmax and Tmin can be carried out according to the scheme of FIG. 6 and the PE can then be calculated in accordance with Equation II.

$$PE = \frac{Tmax - Tmin}{Tmax} * 100\% \quad \text{(Equation II)}$$

At a minimum, the elongated element has a PE of 5%.

Without wishing to be bound by theory, the present inventors believe that the mechanism of the invention for selective light transmission is an intrinsic wide range effect which affects the visible range of the electromagnetic spectrum in an approximately linear way. It does not require any solvents, nor any further processing steps such as impregnation with a dichroic dye or dehydration to obtain light transmission properties. In accordance with the present invention, selective light transmission may be obtainable by adjusting the draw ratio at which the elongated element is formed. Again, without wishing to be bound by theory it is believed that the drawing beyond the overdrawing ratio point causes morphological changes that allow the material to show light polarization properties.

The elongated element is primarily polymer-based. Examples of elongated elements in accordance with the present invention include films, tapes, yarns, filaments, fibers and/or threads.

The elongated element typically comprises a film or a tape. Due to the required draw ratio needed to reach the PE of this invention, the polymer may lose abrasion resistance and can become easily damaged upon contact with other materials. This can be overcome with a multi-layered structure, such a structure may for instance be an AB or ABA structure, in which B is the inner layer which conveys the PE, and in which A is the one or more outer layer. The one or more outer layers A are of a lower crystallinity, are preferably transparent in nature, do preferably not polarize light, and may act as a protection for the functional inner layer B. The outer layers may account for 1 to 50 wt % of the total weight of the elongated element. Each of the layers typically comprises a polymeric structure comprising the polyolefin. The polyolefin is preferably selected from polyethylene or polypropylene and may be a homopolymer or a copolymer. The layers may alternatively comprise a plurality of polyolefins, which may be homopolymers and/or copolymers.

As previously mentioned, the multi-layered structure is typically preferred as this allows for minimal loss of abrasion resistance of the elongated element. The abrasion resistance is typically optimally reduced if the outer layer comprises a polymeric structure with a lower crystallinity than the polymeric structure of the inner layer. The degree of molecular orientation of the outer layer may accordingly be small compared to the molecular orientation of the inner layer. Such difference in crystallinity may be obtained by using a semi-crystalline polymer, such as a polypropylene and/or polyethylene homopolymer in the inner layer and an amorphous polymer, such as a copolymer, in the one or more outer layers.

For instance, both the inner and outer layers may comprise polypropylene. In such cases, the inner layer may comprise polypropylene homopolymers. These homopolymers typically have a weight average molecular weight of at least 250000 g/mol (as determined by GPC) and/or a melting point (i.e. the DSC melting point, measured according to ISO 11357-3) of at least 160° C. The outer layers may accordingly comprise a copolymer of propylene with ethylene.

Advantageously, the present invention is not limited to unsaturated polyolefins having conjugated bonds. The polyolefin for use in the present invention may accordingly also be a saturated polyolefin. In contrast, conventional polarizers typically require unsaturated polyolefins having conjugated bonds to achieve dichroism (see e.g. U.S. Pat. No. 5,666,223). In fact, for the present invention, saturated polyolefins are preferred over unsaturated polymers because of their higher stability.

Preferably the melting point of the inner layer is higher than the melting point of the outer layers. The melting point of the outer layers may differ from the inner layer material by e.g. 10° C. or more. The maximum difference in melting point is not particularly critical, however for practical reasons the difference will usually be less than 70° C. Good results were obtained for a difference in melting temperature between 15 and 40° C.

It was found that particularly good results are obtained when a random copolymer is used for the outer layer(s). Alternatively, or additionally, the polyolefin for the outer layers may be prepared by using a metallocene catalyst. Using such a catalyst typically results in a metallocene based statistical polymer. A suitable metallocene catalyst is rac-$[Me_2Si(\text{-}Me\text{-}4\text{-}(1\text{-}Naphtyl)Ind)_2]ZrC_{12}H$.

Particularly good results have also been obtained for an elongated element comprising one or more outer layers comprising a copolymer comprising an ethylene content between 75 mol % and 99 mol % and a propylene content between 1 mol % and 25 mol %, based on the total amount of polymer, and an inner layer comprising a polyethylene homopolymer.

The preferred polyethylene homopolymer in the inner layer may for instance be a high-density polyethylene (HDPE). The density thereof is typically at least 950 $kg/m^3$. The weight average molecular weight is preferably at least 250000 g/mol and/or with a melting point of at least 130° C. In such cases, the outer layer may also comprise polyethylene, but with a lower melting point. Suitable polymers for the outer layer are in such cases random or block ethylene copolymers, linear low density polyethylene (LLDPE), low density polyethylene (LDPE), very low density polyethylene (VLDPE) and the like.

For an inner layer comprising a polypropylene homopolymer particularly good results are obtained when combined with one or more outer layers comprising a propylene ethylene copolymer having an ethylene content of between 1 mol % and 25 mol % and a propylene content of between 75 mol % and 99 mol %. These particularly good results include increased adhesion of the outer layers to the inner layer. Additionally, the elongated element typically has very good strength, impact resistance and abrasion resistance.

It may be appreciated that in cases of an ABA structure, the individual outer layers may differ slightly in composition.

The mechanical properties such as strength and impact resistance may further be optimized by having the elongated element unidirectionally drawn at a draw ratio within an overdrawing region. The tensile strength of the elongated element is preferably at least 480 MPa. The Young's modulus is preferably at least 12.5 GPa. The tensile strength and Young's modulus are measured according to ASTM D3822. Tensile strength of the polarizer according to the invention significantly exceeds that of PVOH polarizers, which are generally about 160 MPa (see for instance Zhang, S., Yu, H., Chen, Q. et al. Influence of pentaerythritol on the properties of polyvinyl alcohol films for the polarizers. J Polym Res 27, 31 (2020)). The high mechanical properties make the polarizer according to the invention suitable for standalone applications such as, but not limited to, fabrics processed in Sulzer type looms.

The draw ratio is typically defined as the difference in speed between stretch rollers. The overdrawing region is known in the art as the range in which mechanical properties in the drawing direction are greatly enhanced, due to the higher molecular alignment achieved. Additionally, by drawing at a draw ratio within the overdrawing region, maximal polarizing effect (i.e. low light transmittance in a particular polarization plane) has been observed. It is dependent on the polymer type and molecular weight what the exact overdrawing region is. Further, generally, the draw ratio is selected dependent on the desired level of light transmittance. Typically, this draw ratio is at least 5, preferably at least 13, more preferably between 20 and 50.

The elongated element is drawn unidirectionally. Typically, the light in the plane essentially parallel to the drawing direction is at least partially absorbed and/or scattered by the elongated element. The PE may accordingly be found if one of the transmitted directions is essentially parallel to the drawing direction. Nonetheless, the PE may in any case be found by measuring any two transmitted light intensities which are orthogonal to each other at all possible angles. At a certain angle the difference between Tmin and Tmax is at a maximum, which is accordingly used to determine the maximum light transmitted percentage. The measurement of PE can for example be carried out according to the scheme of FIG. 6. Both Tmax and Tmin can be calculated as the average light intensities over wavelengths 400 to 650 nm. For example, for a transmitted light in the orthogonal direction with respect to the drawing direction (i.e. Tmax) of 39 W/m$^2$ and the transmitted light in the parallel direction with respect to the drawing direction (i.e. Tmin) is 22 W/m$^2$, then the light intensity difference of 17 W/m$^2$ is in the example the largest difference observed for any two orthogonal transmitted light intensities, then the PE is $$\frac{39-22}{39}*100=43.6\%.$$

Measurements of transmittance may be carried out in any suitable apparatus, such as a spectrophotometer. Typically the used wavelengths are in the visible light spectrum, such as between 400 to 650 nm. For the purpose of measuring the PE and in order to provide linearly polarized light to the polarizer, a linear light polarizer can be placed after the light source, and before a polarizer according to the invention. Transmittance is accordingly measured in a variety of planes in order to find the maximum light transmittance difference to determine the maximum PE. Generally, the PE is below 95%. Preferably, the PE is between 5 and 50%, such as between 10 and 45%, preferably between 20 and 40%.

Conventional polarizers are limited in the amount of heat they can withstand before losing optical properties or being observed softening effect of the material's mechanical properties. This both limits processing step range of temperatures as well as working temperatures. Favorably, the polarizers according to the present invention, being producible with different types of polymers, and corresponding glass transition and melting temperatures, are able to maintain their properties in a broader range of temperatures than conventional polarizers. More specifically, upon heating a PVOH-based conventional optical polarizer, one can observe a change in properties in the vicinities of its glass transition temperature (80° C. to 90° C.), leading to a non-linear response. In the present invention if, for example, polypropylene is chosen as base material, no such transition will be observed upon heating from room temperature, as this material has its glass transition temperature below zero (−20° C. to −5° C.).

Figure 8:
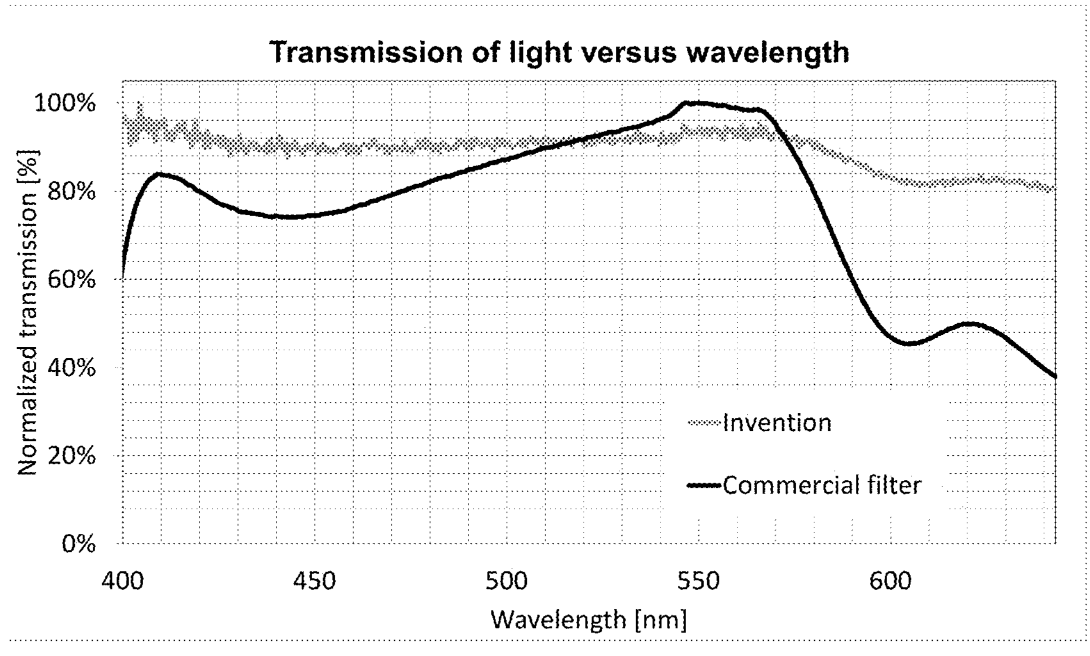
FIG. 8 shows the normalized transmission versus wavelength of a polarizer according the invention versus a commercial polarizing filter. The transmission rate has been normalized to the maximum transmission value for each polarizing filter.

The present invention also enables a particularly linear response to light transmission from different wavelengths within the visible spectrum as illustrated for a particular embodiment in FIG. 8. In this plot, the transmission of a commercial light polarizing film shows a strong non-linear response to the wavelength of incident light, with a particularly strong absorption of light in the orange/red and violet/blue extremes and a lower absorption in the green region. The specific response, for instance the absorption in the orange/red extreme, of the commercial light polarizing film may depend on the angle with which it is placed with respect to the incident light. Nonetheless, a non-linear response is typically observed. The present invention, as illustrated in FIG. 8, shows a particularly linear response in the visible light region, with a minor reduction towards the orange/red end of the spectrum.

The PE may be altered by incorporating pigments in the elongated element. These pigments may for instance selectively reduce the light transmittance in a particular wavelength. Such pigments can include, but are not limited to carbon black. Further, the pigments may be used for an aesthetic look. Additionally, the elongated element may comprise additives such as anti-oxidants and UV-stabilizers. UV-stabilizers may beneficially be used to limit aging of the polymers, and thus increasing their life-time, especially for outdoor applications.

A plurality of the elongated elements may be used to form a non-woven or woven fabric. This for instance also includes a stack of fibers comprising a plurality of the elongated elements. Aesthetic or signaling effects can be produced by alternatively illuminating the fabric with light polarized in particular orthogonal directions.

The fabric may be molded into any object that can be rigid and completely made of the polarizing material. Alternatively and additionally the polarizer may be used to form a material comprising a matrix component reinforced with the polarizer and/or the fabric. The polarizer may also be used as a surface of a product, or placed on the surface of a product.

The fabric may comprise at least a first polarizer having a first PE and at least a second polarizer having a second PE. Herein the first and second PE are different. A third polarizer having a third PE may also be present, etc. This allows for a plurality of light transmittance percentages which may create a more pleasing aesthetic look. The fabric may also comprise an essentially non-polarizing elongated element. This non-polarizing element can have a PE of at most 5%, preferably at most 3%. The fabric may for instance comprise a woven structure wherein a first polarizer is used in one direction (e.g. warp) and the second polarizer and/or a non-polarizing element is used in the orthogonal direction (e.g. weft).

Figure 1:
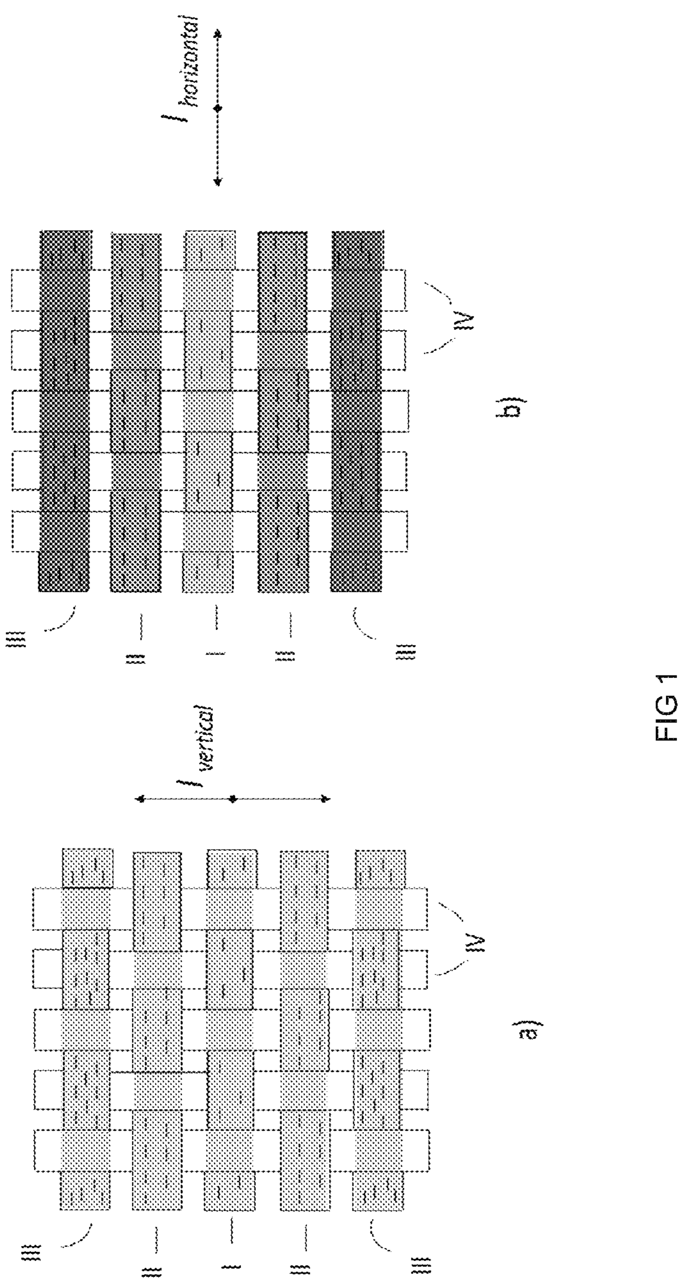
Figure 2:
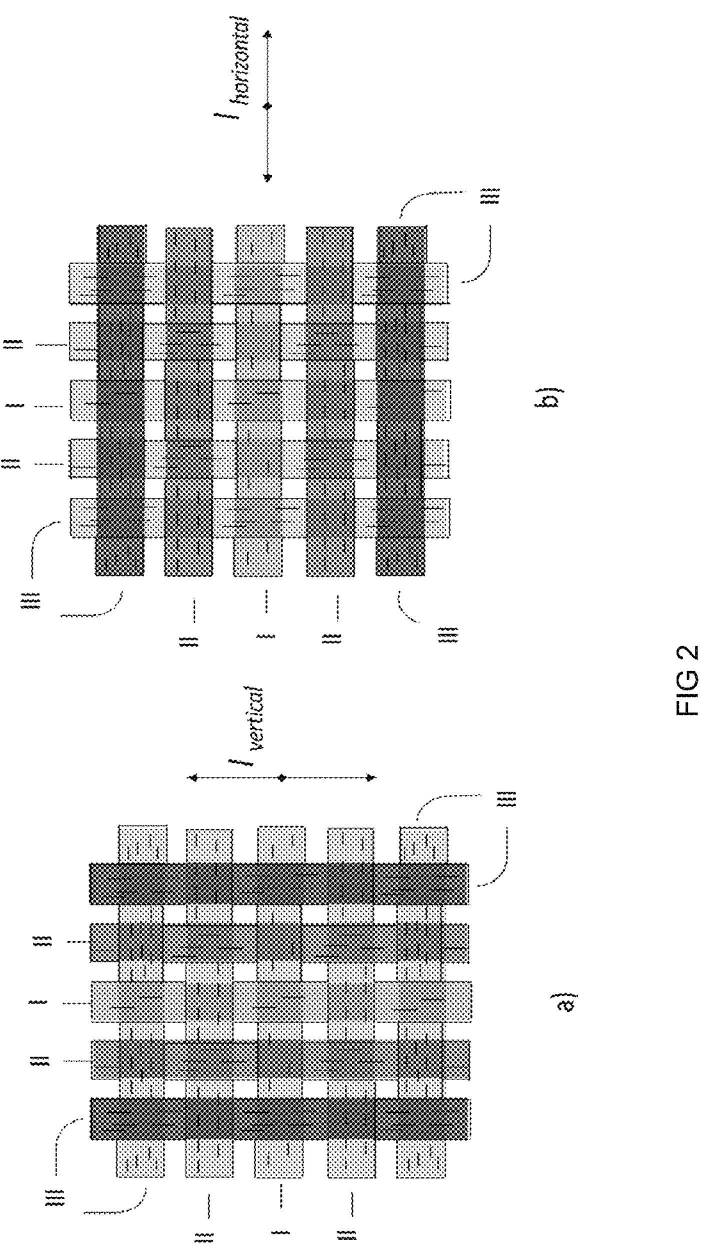

Examples of such fabrics are illustrated in FIG. 1 and FIG. 2. FIG. 1 represents a fabric comprising elongated elements with three different PEs (I—low, II—medium, III—high) in horizontal direction and a non-polarizing elongated element (IV). FIG. 1*a*) illustrates in case the fabric is illuminated by vertically polarized light, $I_{vertical}$ and FIG. 1*b*) illustrates the effect of the fabric when illuminated by horizontally polarized light, $I_{horizontal}$. The stripes within the elongated elements illustrate the drawing direction. Thus, the fabric as illustrated in FIG. 1 comprises a plurality of parallel positioned polarizers with different PEs. This fabric exhibits an homogeneous appearance when illuminated by a linearly polarized light source perpendicular to the longitudinal axis of the polarizers, and a heterogenous appearance when illuminated by a linearly polarized light source parallel to the longitudinal axis of the polarizers.

FIG. 2 illustrates a schematic representation of a fabric comprising elongated elements with three different PEs (I—low, II—medium, III—high) in both orthogonal directions. FIG. 2*a*) illustrates in case the fabric is illuminated by vertically polarized light, $I_{vertical}$ and FIG. 2*b*) when illuminated by horizontally polarized light, $I_{horizontal}$. Thus, fabric as illustrated in FIG. 2 comprises a plurality of parallel and orthogonally positioned polarizers with different PEs. This fabric exhibits a first heterogenous appearance when illuminated by a linearly polarized light source in a particular direction, and a second heterogenous appearance when illuminated by a linearly polarized light source orthogonal to said particular direction.

The polarizing abilities as well as the advantageous mechanical properties allow for the polarizer and the fabric comprising the polarizer to be a versatile material that may find its function in a variety of applications.

Typical applications may include using the polarizer for highly reflective surfaces such as water (e.g. sea and rivers), metal (e.g. car hoods), or snow, which can be a source of visual discomfort. Namely, due to the increased horizontally polarized nature of light that is reflected from such surfaces. This increase can vary in time (e.g. due to water waves, the relative sun movement reflecting light in different snow surfaces, or due to car movement), creating peaks of higher horizontally polarized light intensity. In another example, surfaces such as car hoods, boat decks, sun decks or areas surrounding swimming pools can comprise a fabric and/or polarizer according to the present invention, allowing for a significant improvement in comfort due to the reduction in variation in reflection of horizontally polarized light. Selective light transmission properties, which may be achieved by the polarizer according to the present invention, typically allow for producing articles which dampen such light intensity variations, enabling added visual comfort for those in the interior. Simultaneously the high mechanical properties permit producing articles able to withstand mechanical aggression such as wind. With the polarizer according to the present invention, it is possible to for instance produce camping and beach tents, curtains to be applied in housing near to coastal areas, room partitions, boats, ski resorts or buildings next to high traffic areas. There, the movement of the reflective surfaces is a source of visual discomfort. Transmitted light can still be made significant (adjusted depending on thickness or number of layers applied) but will present smaller intensity variations.

The polarizer can be manufactured by providing an undrawn or partially drawn elongated element and subsequently drawing said element. This undrawn or partially drawn elongated element can be undrawn or drawn in one or more directions before being finally drawn to its final overdrawn state. It may thus, for example, already be partially drawn but not yet drawn into the overdrawing region. The undrawn elongated element typically comprises the multi-layered structure and may be obtainable by e.g. lamination or melt (co-)extrusion of a polyolefin structure. Any additives, such as pigments, UV-stabilizers and/or anti-oxidants can be added during extrusion, which allows for the process to be free of impregnation. It is further noted that there are preferably no dichroic dyes added. Accordingly, the method is typically essentially free of using dichroic dyes, such as essentially free of impregnation of dichroic dyes. The undrawn elongated element may have a thickness between 50 to 900 μm.

The undrawn or partially drawn elongated element is subjected to a drawing process to obtain the elongated element. The drawing process is typically carried out at a temperature below the melting temperature of the inner and/or outer layer(s) and can be considered a unidirectionally solid state drawing process. Bidirectional drawing can also be used to achieve the overdrawing region at which the material will display the polarizing effect. The thickness of the elongated element is typically between 15 to 200 μm. The drawing process is performed at a draw ratio within an overdrawing region. The draw ratio for the unidirectional solid-state drawing process is chosen according to the desired level of PE and is typically dependent on the polymer type and molecular weight. Although at certain draw ratios selective transmission of polarized light is already significantly observable, a much bigger effect, and therefore higher draw ratios, may be desired in order to maximize the polarizing effect. The range of draw ratios at which the effect is best observed typically fall within overdrawing region. Achieving the overdrawing region, for a given polymer, is furthermore done through a careful selection of molecular weight average and distribution.

The drawing process can be carried out using heated rolls, plates, baths or ovens. As a heat transfer medium, air or water can be used. These steps are done without requiring any harmful, corrosive, chemicals or solvents.

The drawing process may be a single-stage process or a multi-stage process, though preferably the drawing process is a multi-stage process. A multi-stage process typically allows for a higher draw ratio and accordingly a better tunability of the PE and mechanical properties. In a multi-stage process, drawing is typically favored by having one of the drawing steps with a draw ratio from 4 to 5. It may also be beneficial to have one of the drawing stages done at a relatively low temperature such as between 30° and 60° C. and the one or more other steps at, at least, 80° C. Accordingly, the multi-stage drawing typically comprises a first drawing stage performed at a lower temperature than a second drawing stage. It has been observed that the multi-stage drawing process can also be favorably applied to obtain maximum achievable draw ratio for elements comprising a polymer based on metallocene catalysts.

For the purpose of clarity, and a concise description, features are described herein as part of the same or separate embodiments, however, it will be appreciated that the scope of the invention may include embodiments having combinations of all or some of the features described.

The invention may further be illustrated by the following non-limiting examples.

EXAMPLE 1

Preparation of Polarizing Tapes

Tapes of polypropylene were prepared in a Dr. Colin laboratory extrusion line using an E30M extruder and a flat T-die head with a temperature profile starting at 190° C. at the first extruder section and 245° C. on the die head. The cast film was cooled using a chill-roll and slit in a haul-off unit fitted with a cutting station. The slit tapes were drawn using a second haul-off unit running at a draw ratio of 1:6 and consequently drawn again in the machine direction using a stretch ratio of 1:2.9 via a third haul-off. The tapes produced when overlapped aligned parallel to their orientation direction showed a higher light transmittance than overlapped tapes placed orthogonally to each other, qualitatively showing a polarizing effect.

The tapes produced had a tensile strength of 500 MPa, an elastic modulus of 12.5 GPa in the machine direction and an elongation at break of 7%.

EXAMPLE 2

General Transmittance and Polarizing Effect

Measurements of transmittance were carried out in a spectrophotometer in wavelengths between 400 to 643 nm to demonstrate the selective light transmittance behavior. Linear light polarizers prepared as described in Example 1, varying in Overdraw parameter, were placed after a linearly polarized light source. The polarizing effect is calculated and presented in FIG. 3 and its average in Table 1 as a function of the Overdraw parameter. FIG. 4 illustrates the reduction over the measured wavelengths for the polarizers with the Overdraw parameter.

TABLE 1

| Overdraw parameter | PE |
|---|---|
| 0.82 | 1.7 |
| 1.46 | 25.4 |
| 1.57 | 41.6 |

Figure 3:
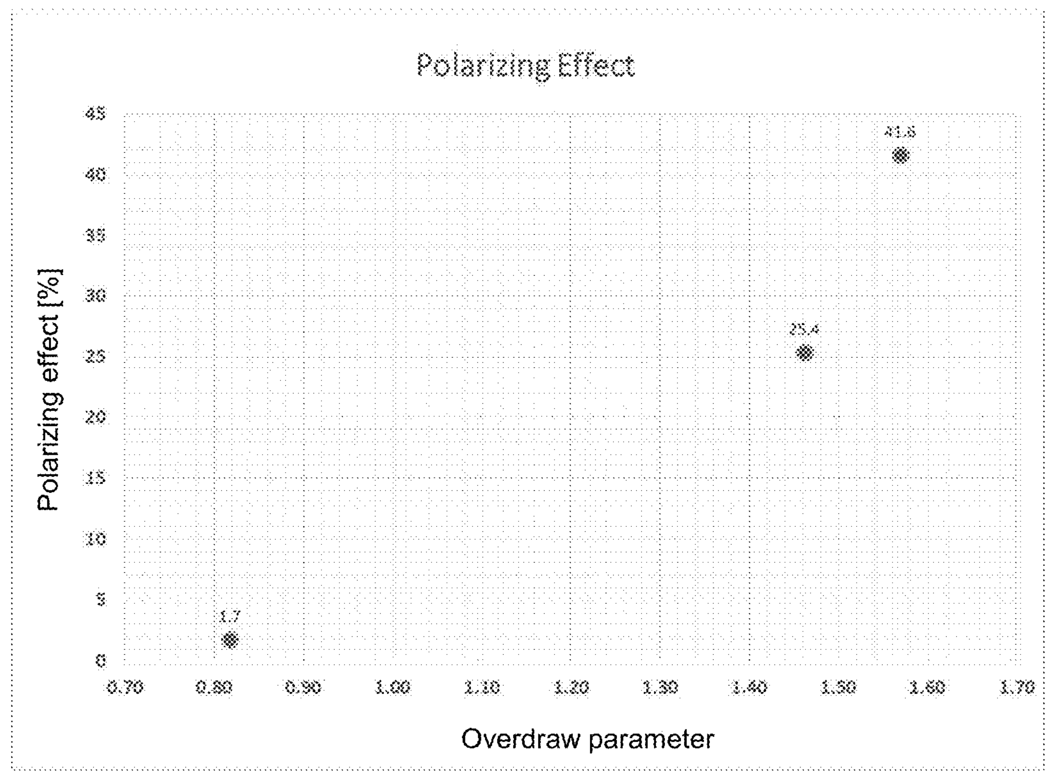
FIG. 3 illustrates the polarizing effect as a function of the Overdraw parameter defined in Equation I for preferred polarizers according to the present invention.
Figure 4:
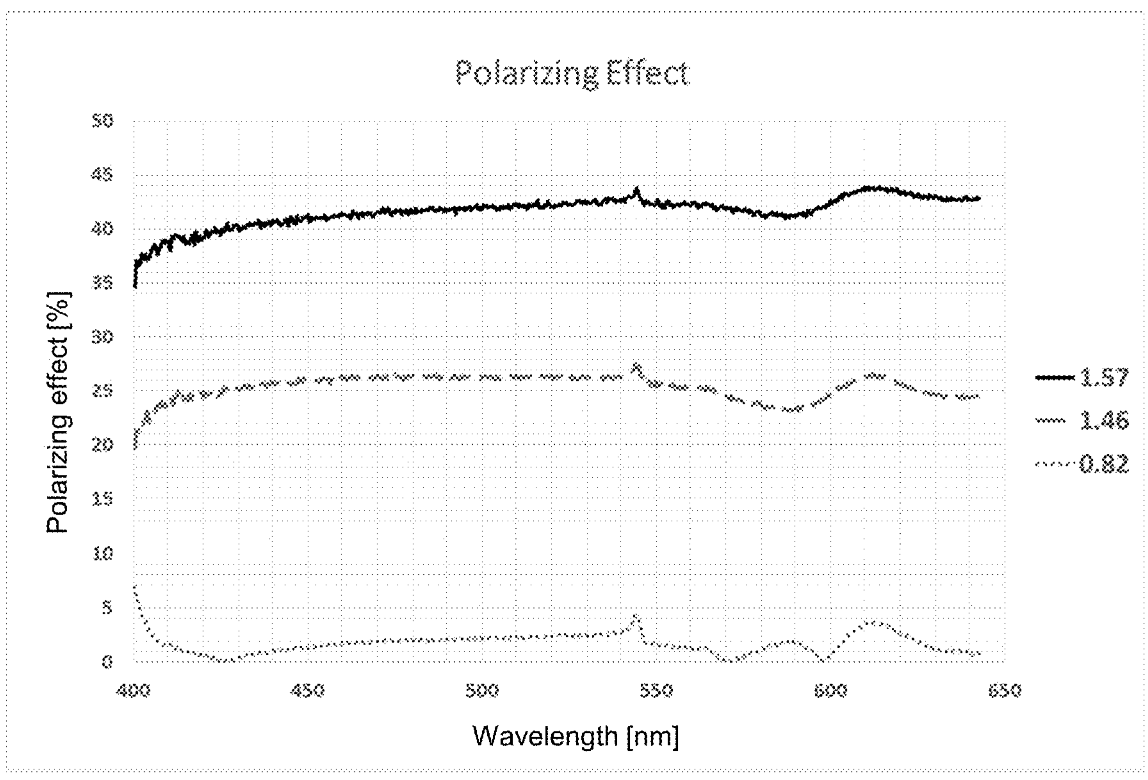
FIG. 4 illustrates the polarizing effect as a function of wavelengths for preferred polarizers according to the present invention.

As can be seen from Table 1 and FIGS. 3-4, a higher Overdraw parameter allows for a higher PE. Furthermore, FIG. 4 illustrates that the reduction remains over approximately all the wavelengths of the visible light spectrum showing the linear behavior of the invention.

FIG. 8 presents normalized transmittance of the light polarizer according to the present invention with an overdraw parameter of 1.57 as shown in Table 1, versus that of a commercially available polarizer. Values are normalized by the maximum transmittance of each polarizer to show the quality of the response of each of them. From the figure, the linear response of the polarizer of the invention and a strong non-linear behaviour of the commercial polarizer can be deduced.

EXAMPLE 3

Polarizing Effect Using Carbon Black Pigment

Measurements of transmittance were carried out in a spectrophotometer in wavelengths between 400 to 643 nm to demonstrate the selective light transmittance behavior. A commercial light polarizer was placed after the light source, and before a polarizer according to the present invention and prepared according to Example 1 but including 0.3 wt % of a carbon black pigment. Pigments are much larger than dyes, showing significantly higher light fastness and hence durability when compared to other coloring solutions, whereas dyes are soluble molecules typically used for coloring materials, they are typically much less stable than pigments, both with regards to electromagnetic radiation but also to chemical attacks. Pigments on the other hand are only physically bound to the polymer and are significantly more stable to both light and chemical attacks.

Figure 5:
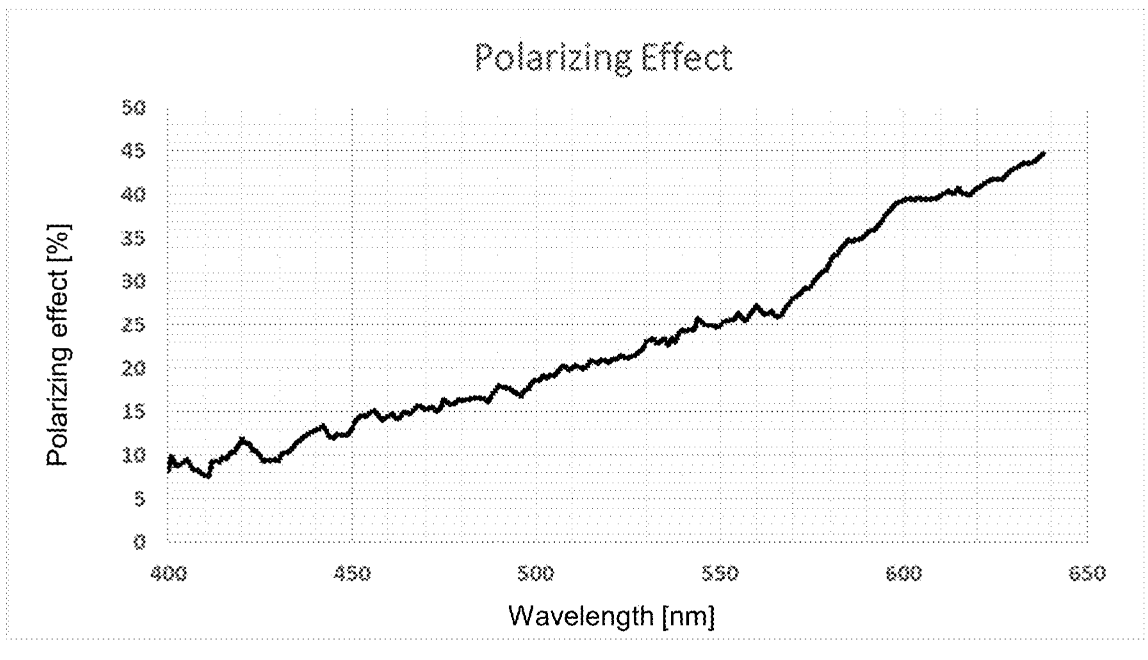
FIG. 5 illustrates the polarizing effect as a function of wavelength for a preferred polarizer according to the present invention comprising carbon black.

The resulting polarizing effect is shown in FIG. 5. As can be seen, by including carbon black, the light transmittance can be tuned to specific wavelengths by blending in specific pigments onto the described invention.

EXAMPLE 4

Transmittance of Polarizer Based on Polyethylene

Figure 7:
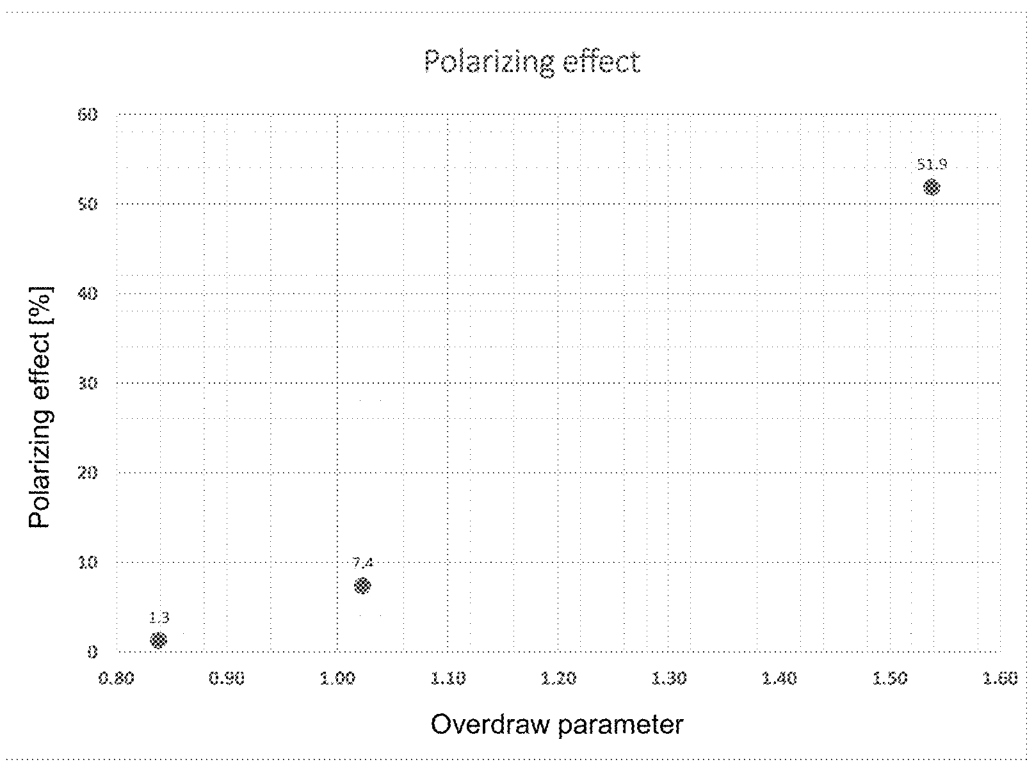
FIG. 7 illustrates the polarizing effect as a function of the Overdraw parameter defined in Equation I for preferred polarizers according to the present invention using an alternative polymer.

Measurements of transmittance were carried out in a spectrophotometer in wavelengths between 400 to 643 nm to demonstrate the selective light transmittance behavior. A linear light polarizer was placed after the light source, and before a polarizer produced according to Example 1 but using polyethylene as a starting polymer and varying the Overdraw parameter. The resulting polarizing effect is shown in FIG. 7. This figure shows that a light polarizer can be based on different polymers. These may have different physical and mechanical properties and therefore may be selected in accordance with any post processing need, or requirements for the working conditions of the intended use.

EXAMPLE 5

Measurement of Transparency of Polarizers

Figure 9:
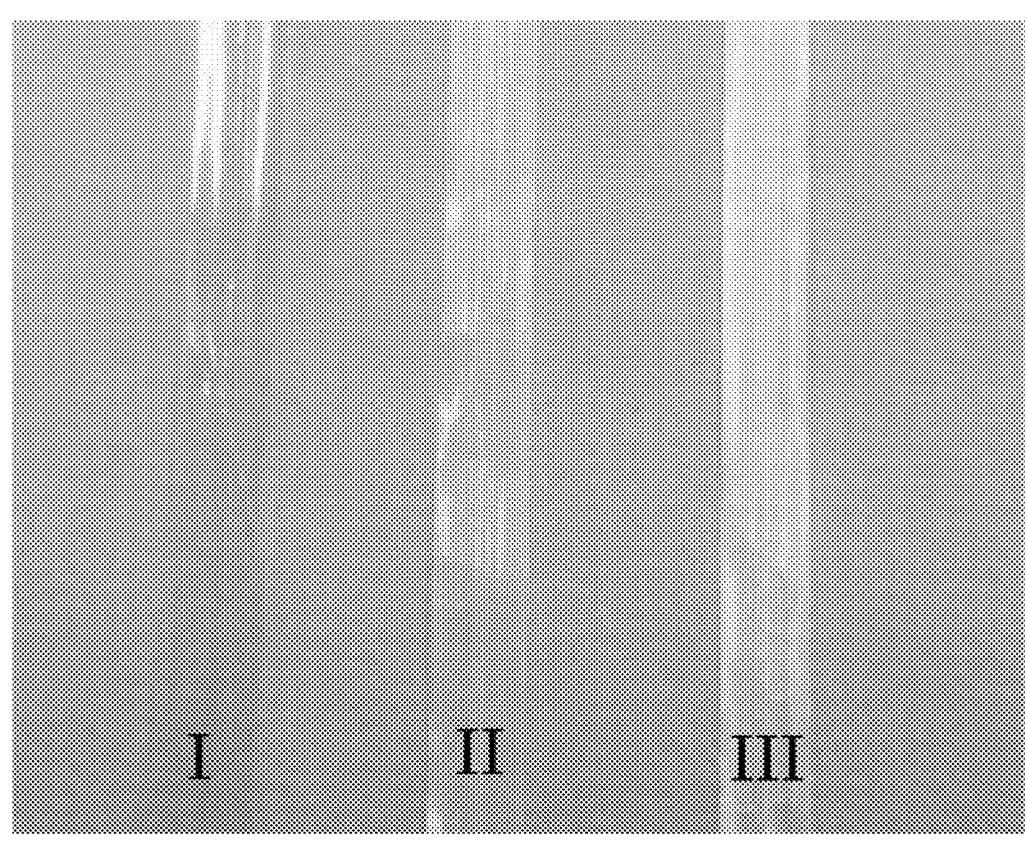
FIGS. 9 and 10 show photographs and transmittance curves of the three tapes I, II and III as described in Example 5.

Three tapes were prepared as described in Example 1. FIG. 9 shows photographs of the tapes. Tape I was produced with a draw ratio of 10.9, below overdrawing ratio, and is visually highly transparent. Tape II was produced at the onset of overdrawing and shows a noticeable loss of visual transparency. Tape III was produced at draw ratio of 13, beyond the overdrawing ratio, and shows a noticeable loss of visual transparency.

Figure 10:
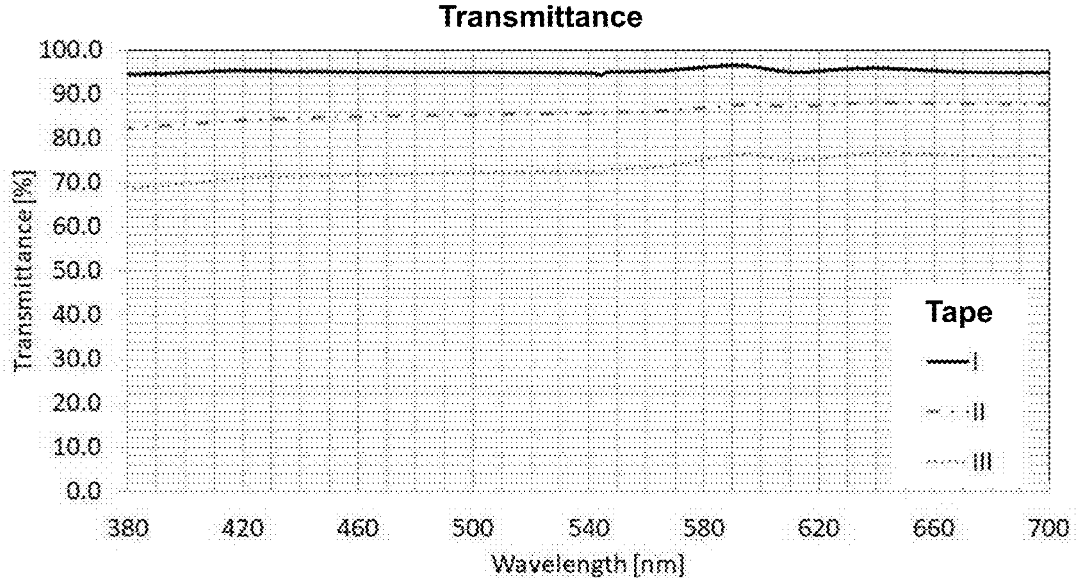

Light transmittance in the range of 380 to 700 nm of these tapes was measured by Cary series UV-VIS-NIR Spectrophotometer, Agilent Technologies. Results are depicted in FIG. 10.

The invention claimed is:

1. A polarizer comprising an elongated element comprising a polyolefin, wherein the elongated element is unidirectionally drawn at a draw ratio within an overdrawing region and wherein the elongated element has a polarizing effect (PE) of at least 5% and less than 95%, wherein the polarizing effect is defined as the largest difference between light transmittance of two essentially orthogonally polarized components (Tmax and Tmin) of a visible light beam in accordance with the below Equation II.

$$PE = \frac{Tmax - Tmin}{Tmax} * 100\% \quad \text{(Equation II)}$$

2. The polarizer according to claim 1, wherein the elongated element a) is a multilayered elongated element that comprises an inner layer and one or more outer layers, wherein the one or more outer layers weigh in between 1 to 50 wt % of the total weight of the elongated element;

b) is a multilayered elongated element that comprises an inner layer and one or more outer layers, which each independently comprise a polyolefin and wherein the inner layer and one or more outer layers each independently comprise a polymeric structure, wherein the polymeric structure of the one or more outer layers has a lower crystallinity than the polymeric structure of the inner layer;

c) comprises a polyolefin homopolymer and/or copolymer wherein the polyolefin is polypropylene and/or polyethylene;

d) comprises a yarn, a tape or a film having a thickness between 15 to 200 μm;

e) is unidirectionally drawn at a draw ratio of at least 20; and/or f) has a tensile strength of at least 480 MPa.

3. The polarizer according to claim 1, wherein the polyolefin is a saturated polyolefin.

4. The polarizer according to claim 1, wherein the elongated element has a transmittance over the visible range of 380 to 700 nm of less than 80% as determined by UV-VIS-NIR spectrophotometry.

5. The polarizer according to claim 1, wherein the elongated element further comprises one or more pigments.

6. The polarizer according to claim 1, comprising a woven or non-woven fabric of a plurality of the elongated elements.

7. The polarizer according to claim 6, further comprising an essentially non-polarizing elongated element with a PE of at most 5%.

8. The polarizer according to claim 6, comprising at least a first polarizer having a first PE and at least a second polarizer having a second PE, wherein the first and second, PEs are different.

9. The polarizer according to claim 1, which is essentially free of dichroic dyes.

10. The polarizer according to claim 1, wherein the elongated element is produced without a dehydration stage or chemical reactions.

11. Object obtainable by molding the polarizer according to claim 1.

12. Material comprising a matrix component reinforced with a polarizer according to claim 1.

13. Method for producing the polarizer according to claim 1 comprising providing an undrawn or partially drawn elongated element and subjecting the undrawn or partially drawn element to a single stage or multi-stage drawing at a draw ratio within an overdrawing region to obtain the elongated element.

14. The method according to claim 13, wherein the drawing is multi-stage drawing, wherein a first drawing stage is performed at a lower temperature than a second drawing stage and further comprising co-extrusion and/or lamination of an inner layer and one or more outer layers to provide an undrawn multilayered elongated element, wherein co-extrusion and/or lamination is performed in the presence of anti-oxidants, pigments and/or ultraviolet stabilizers.

15. A product comprising a surface that comprises the polarizer according to claim 1.

16. The polarizer according to claim 1, wherein the elongated element has a PE of between 5 and 50%.

17. Use of a multilayered elongated element as a polarizer, wherein the multilayered elongated element comprises an inner layer and one or more outer layers each independently comprising a polyolefin, wherein the elongated element is unidirectionally drawn at a draw ratio within an overdrawing region and wherein the elongated element has a polarizing effect (PE) of at least 5% and less than 95%, wherein the maximum polarizing effect is defined as the largest difference between light transmittance of two essentially orthogonally polarized components (Tmax and Tmin) of a visible light beam in accordance with the Equation II below.

$$PE = \frac{Tmax - Tmin}{Tmax} * 100\% \quad \text{(Equation II)}$$

18. Use of a multilayered elongated element as a polarizer in accordance with claim 17 in a fabric, which fabric comprises a plurality of parallel positioned polarizers with different PEs to provide a homogeneous appearance when illuminated by a linearly polarized light source perpendicular to the longitudinal axis of the polarizers, and a heterogenous appearance when illuminated by a linearly polarized light source parallel to the longitudinal axis of the polarizers.

19. Use of a multilayered elongated element as a polarizer in accordance with claim 17 in a fabric, which fabric comprises a plurality of parallel and orthogonally positioned polarizers with different PEs to provide a first heterogenous appearance when illuminated by a linearly polarized light source in a particular direction, and a second heterogenous appearance when illuminated by a linearly polarized light source orthogonal to said particular direction.

* * * * *